(12) United States Patent
Moir

(10) Patent No.: US 8,190,393 B2
(45) Date of Patent: May 29, 2012

(54) HELICOPTER BLADE POSITION DETECTOR

(76) Inventor: Christopher I. Moir, Malvern Wells (GB)

(*) Notice: Subject to any disclaimer, the term of this patent is extended or adjusted under 35 U.S.C. 154(b) by 424 days.

(21) Appl. No.: 12/300,990

(22) PCT Filed: May 17, 2007

(86) PCT No.: PCT/GB2007/001823
§ 371 (c)(1),
(2), (4) Date: Apr. 2, 2009

(87) PCT Pub. No.: WO2007/132250
PCT Pub. Date: Nov. 22, 2007

(65) Prior Publication Data
US 2010/0063767 A1    Mar. 11, 2010

(30) Foreign Application Priority Data

May 17, 2006    (GB) .................................. 0609723.2

(51) Int. Cl.
*G01B 11/14*    (2006.01)
*G06F 17/40*    (2006.01)
(52) U.S. Cl. ......... 702/151; 702/150; 702/166; 356/614
(58) Field of Classification Search .................. 702/151, 702/150, 166
See application file for complete search history.

(56) References Cited

U.S. PATENT DOCUMENTS

| 3,282,093 | A | | 11/1966 | Rehder |
| 3,307,164 | A | | 2/1967 | Zimmer |
| 3,316,759 | A | | 5/1967 | Rehder |
| 3,856,410 | A | | 12/1974 | Swift et al. |
| 4,465,367 | A | * | 8/1984 | Sabatier .......................... 356/23 |
| 4,604,526 | A | * | 8/1986 | Moir .......................... 250/559.3 |
| 5,249,470 | A | * | 10/1993 | Hadley et al. .................... 73/655 |
| 5,259,729 | A | * | 11/1993 | Fujihira et al. .................. 416/25 |
| 6,322,324 | B1 | * | 11/2001 | Kennedy et al. .................. 416/1 |

FOREIGN PATENT DOCUMENTS

| DE | 1248482 | 8/1967 |
| DE | 1 406 574 | 10/1968 |

(Continued)

OTHER PUBLICATIONS

Notification of the First Office Action—Chinese Patent Application No. 200780022571.8 dated Jul. 21, 2010.

(Continued)

*Primary Examiner* — Hal Wachsman
(74) *Attorney, Agent, or Firm* — Marshall, Gerstein & Borun LLP

(57) ABSTRACT

A position detector for detecting the position of a helicopter blade includes a sensor to generate a signal in dependence on the position of a helicopter blade with respect to the sensor, and a data processing module arranged to receive the signal from the sensor and generate an output indicative of the blade position from the received signal. The sensor includes a mask having a plurality of slits, a lens assembly, and light detector. The lens assembly has a field of view and directs incident light onto a focal plane of the lens assembly. The light detector detects the level of illumination passing through each of the slits in the mask and provides a signal indicative of the illumination level to the data processing module. The mask is located at the focal plane of the lens assembly and the slits formed in the mask are angularly divergent from one another.

15 Claims, 3 Drawing Sheets

FOREIGN PATENT DOCUMENTS

EP      0396623      9/1993

OTHER PUBLICATIONS

International Search Report for PCT/GB2007/001823, mailed Aug. 17, 2007.
Examination Report in Application No. CA 2,652,591 dated Jun. 15, 2010 (2 pages).
Second Office Action in Application No. CN 200780022572.8 dated May 3, 2011 (5 pages).
Examination Report in Application No. EP 07 732 845.8 dated Feb. 23, 2010 (3 pages).
Examination Report in Application No. GB 0709521.9 dated Oct. 27, 2008 (1 page).
Examination Report in Application No. IL 195302 dated Sep. 27, 2011 (2 pages).
Translation of Notification of Third Office Action in CN Application No. 200780022572.8 dated Mar. 2, 2012.
Third Office Action in CN Application No. 200780022572.8 dated Mar. 2, 2012.

* cited by examiner

HELICOPTER BLADE POSITION DETECTOR

BACKGROUND TO THE INVENTION

This invention relates to a position detector for detecting the position of a moving object. For example, it is desirable to be able to detect the vertical and rotational position of the rotor blades of a helicopter rotor assembly at various positions along their length as they rotate and to detect the blade pitch angle of each rotor blade so that any lack of uniformity in the deflection, timing or pitch of any or all of the blades in the rotor assembly from any given reference position can be determined and subsequently corrected.

Known techniques for detecting the position of helicopter rotor blades include, for example, the creation (by means of a lens) of an image of a blade tip onto a sensor so that the moving blade will generate a sensor output that can be related to the blade position and the use of sensors and timing marks on the rotor shaft to create timing reference signals which are used to measure any changes in rotational position of the blades.

Another known technique is to use sensors onto which an image of a blade tip is formed onto a single rectangular aperture with a width less than the image width and of sufficient aperture length to accommodate all possible vertical movement of the blade image. Movement of the blade across the aperture changes the amount of light passing through the aperture, such change being detected by an electronic sensor. As the amount of light passing to the sensor when no blade is present can also be measured, a ratio of the two signals can be computed which allows a height signal corresponding to each blade which is independent of the background illumination. However, it is not possible using this technique to detect the pitch of any given blade, and therefore ambiguity of measurement occurs if any given blade is not at the same pitch as the others, and particularly if the rotational position of that same blade is different to the others. In this technique the calibration of the sensor is highly dependent on the amount of light falling on the sensor.

Sensors have also been employed in which an image of a blade tip is formed on a multi element detector (such as a charge coupled device (CCD) as used in a television camera). Accuracy is limited to the image size divided by the number of sensor cells. When a high number of cells is used to increase vertical accuracy, the sensor takes longer to read out the data, thereby reducing the rotational accuracy measurement. Again, it is not possible with this technique to detect the pitch of any given blade and therefore ambiguity of measurement occurs if any given blade is not at the same pitch as the others, particularly if the rotational position of that same blade is different to the others.

Other known techniques include the projection of images of passing blade tips onto linear X-Y graticules as a means of measurement, or onto detector X-Y arrays.

In all of the above mentioned techniques, the measurement relies on a light level contrast between the background (normally the sky in daylight) and the blade. The blade can also be illuminated from some light source and the reflected light measured by the sensor, allowing the position detector to be used in reduced light conditions. In most of the previous methods, in order to relate the amount of light read by the sensor to a given change in position of the blade, the background illumination needs to be measured, and some compensating calculation performed to normalise the data to a known median value.

Again from the prior art, it is also known that precise beams of illumination at a given angular separation can be generated and positioned such that a blade passing through the beams will create pulses of light, the relative timing of which will change with the blade height in some linear relationship to the beam angle, these pulses then being reflected back to the sensor and detected. The accuracy of this method relies on the precise nature of the illuminating beams, as any spreading of the beams (a natural physical phenomenon associated with projected light) will degrade that accuracy.

It is well known by persons skilled in the art of helicopter rotor measurement that in order to correctly adjust the flight characteristics of the main rotor blade in the most effective way for a whole rotation of a rotor system, the position of the blade should be measured shortly after the blade has passed through the "ahead" position over the front of the helicopter. As a first approximation, if the blade is vertical and rotational position is correct at or near this point, then the performance of the blade as it rotates will also be correct at other points on its flight path. For smaller rotors (such as the tail rotor), the measurement should be taken at a point where the blade flight path is not disturbed by air flowing adjacent to the tail boom of the helicopter.

Any sensor therefore needs to view the rotor blades at or near to these positions and in order to do so is often mounted on the external skin of the helicopter with its position set to give an unrestricted field of view of the required part of the blades and therefore the components of the sensor must be capable of withstanding any changes in environmental conditions encountered. Alternately, if internal mounting is possible, with the sensor viewing the blade through the glass canopy of the helicopter, it will need to be placed close to the normal flight instrumentation of the helicopter and therefore be designed so that its operation does not interfere with that instrumentation (for example, the compass, radios and navigation systems). Note, however, that any blade may also be viewed at any other rotational position.

In addition to accurate blade tip tracking, it would be a significant advantage to the helicopter industry to be able to accurately measure the pitch angle of the blade tip and also the vertical position of the blade at other points along its length (the latter being referred to generically in this application as "mid blade tracking"). This is particularly important for some of the larger diameter rotors where, for example, a blade which flies too high in the middle of its length when the tip is flying correctly or too low will be dynamically unstable and will oscillate at some frequency relating to the blade length and stiffness and to rotor speed and such oscillation may cause structural damage to the blade and/or to the entire rotor assembly. It is also of significant importance to be able to measure blade pitch in smaller diameter (often higher speed) tail rotors (and as a further example, for fans, aircraft propellers and similar devices).

Although the invention will be particularly described as applied to fans, propellers and helicopter rotors, it will be appreciated that it can be used for detecting the position of other moving targets or articles, for example the vertical deflection of the end of a moving cantilever beam or components of other rotating machinery.

SUMMARY OF THE INVENTION

According to a first aspect of the present invention there is provided a position detector for detecting the position of a helicopter blade comprising a sensor arranged to generate a signal in dependence on the position of a helicopter blade with respect to the sensor and a data processing module arranged to receive the signal from the sensor and generate an output indicative of the blade position from the received signal, the sensor comprising;

a mask having a plurality of slits formed therein;

a lens assembly having a field of view and being arranged to direct incident light onto a focal plane of the lens assembly; and a light detector arranged to detect the level of illumination passing through each of the plurality of slits in the mask and provide a signal indicative of the illumination level to the data processing module, wherein the mask is located at the focal plane of the lens assembly and wherein the slits formed in the mask are angularly divergent from one another.

The data processing module is preferably arranged to receive the signal for each slit and sum the signals to generate a combined signal, wherein the ratio of combined signal amplitude when a blade is in the field of view to when a blade is not in the field of view is indicative of blade height in relation to the sensor position.

Additionally or alternatively, the data processing module may be arranged to receive the signal for each slit and to determine the time delay between signals from adjacent slits, wherein the time delay is indicative of blade height in relation to the sensor position.

The mask may be arranged such that the slits are substantially longitudinally aligned with a blade as the blade passes through the field of view of the lens assembly and the data processing module is arranged to determine the rate of change of signal for each slot as the blade passes across the slot, the rate of change of signal being proportional to the pitch angle of the blade.

The data processing module may be arranged to modify the height of the blade in relation to the sensor position as indicated by the ratio of combined signal amplitude in dependence on the determined blade pitch angle.

The angle of divergence between adjacent slits is preferably uniform and the number of slits is preferably at least three.

The light detector may comprise a plurality of lenses, each lens arranged to receive the light from a respective slit and to couple the received light into a respective optical fibre, each optic fibre being coupled to the data processor. Alternatively, the light detector comprises one or more light sensitive elements arranged to receiving light from the slits and convert the received light to an electrical signal transmitted to the data processing module.

According to a second aspect of the present invention there is provided a method of detecting the position of a helicopter rotor blade comprising the method steps of providing a first sensor having a lens assembly arranged to gather incident light at a focal plane and a mask located at the focal plane of the lens assembly and having a plurality of angularly divergent slits formed therein;

detecting the amplitude of illumination passing through each of the plurality of slits as the rotor blade passes across the field of view of the lens assembly and providing a signal indicative of the amplitude of illumination; and summing the amplitude signals for each slit to provide an combined signal, wherein the ratio of signal amplitude when a blade is in the field of view of the sensor to when a blade is not in the field of view of the sensor is indicative of the blade height in relation to the sensor position.

Additionally, the slits may be arranged to be substantially parallel to the blade when the blade passes through the field of view of the lens assembly and the field of view of the lens assembly is arranged such that tip of the blade is within the field of view. Subsequently, the time delay between signals from adjacent slits may be determined, the time delay being proportional to the blade height in relation to the sensor position.

Additionally or alternatively, the rate of change of amplitude signal as a blade tip passes across a slit is proportional to the pitch angle of the blade.

Alternatively, the slits may be arranged to be substantially orthogonal to the blade when the blade passes through the field of view of the lens assembly and the field of view of the lens assembly is arranged such that a mid portion of the blade is within the field of view of the lens assembly.

Additionally or alternatively, a first sensor may be provided with slits arranged to be substantially parallel to the blade when the blade passes through the field of view of the lens assembly and determining the pitch angle of the blade from the signals generated from the first sensor, a second sensor provided with slits arranged to be substantially orthogonal to the blade when the blade passes through the field of view of the lens assembly and determining the height of the blade in relation to the second sensor position from the signals generated from the second sensor and the blade height signal of the second sensor is modified according to the blade pitch angle determined by the first sensor.

BRIEF DESCRIPTION OF THE DRAWINGS

Embodiments of the present invention will now be described below by way of illustrative example only example, with reference to the accompanying drawings, in which.

DESCRIPTION OF EMBODIMENTS OF THE INVENTION

Figure 1:
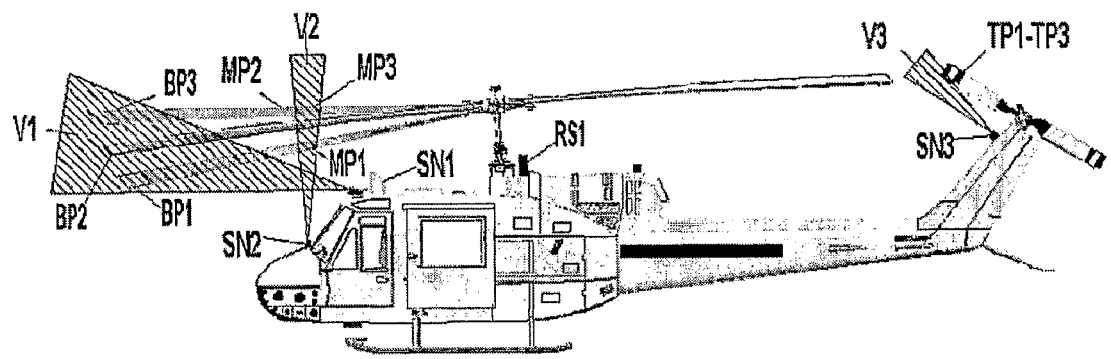
FIG. 1 is a diagrammatic side elevation of a helicopter using sensors according to the invention.

FIG. 1 illustrates a position detector according to an embodiment of the present invention comprising one or more sensors mounted onto a helicopter airframe in any or all of typical positions SN1, SN2, SN3 and arranged to view a part of a rotating helicopter blade as it passes through each sensor field of view V1, V2, V3. The position detector is preferably integrally attached to the airframe of the helicopter in a position which is suitable for viewing the rotor blade. Alternatively the position detector may be held by a person or any suitable temporary clamping device in such a position.

Figure 2:
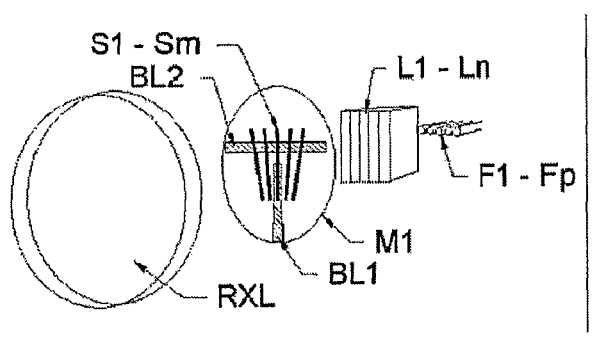
FIGS. 2 and 3 are schematic illustrations of embodiments of the sensor and its constituent parts.

FIG. 2 schematically illustrates a sensor included within an embodiment of the position detector. The sensor includes a lens assembly RXL comprising one or more optical elements with a field of view sufficiently wide so as to view a passing blade at any required radial height or position without requiring the sensor to be repositioned and having a focal plane at which incident light is gathered. The image produced will be as shown by BL1 in FIG. 2 when the sensor is located in positions SN1 or SN3, which is the case for blade tip tracking and for pitch angle measurement. The image BL2 of the blade shown in FIG. 2 is produced when the sensor is located in position SN2 or SN3 for mid blade tracking. It is to be noted that in embodiments of the present invention it is not a requirement for the lens assembly to produce a focussed image of the blade but merely to gather the light incident on the sensor at its focal plane, since in embodiments of the present invention it is the amplitude of incident light that is of interest, as will be explained in more detail below.

The sensor also contains a planar opaque mask M1 placed at the focal plane of the lens assembly in which are fabricated a number of thin slits S1-Sm that are angularly divergent with respect to each other. In preferred embodiments of the present invention three slits are provided. Each slit has a minimum length equal to the maximum displacement of the image of a blade in any of its extreme positions within the field of view of the sensor. The width of each slit is considerably less than the width of the image of the blade at the image plane of the lens assembly, thereby ensuring that a small change of position of the blade either in height or pitch will create a measurable change in the light passing through each slit.

Figure 3:
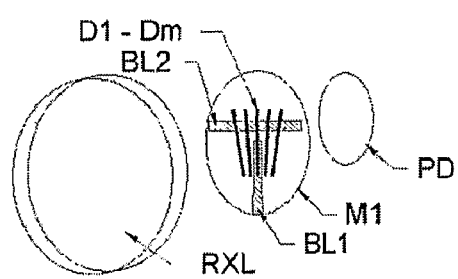

The sensor also contains means of detecting and measuring the amount of light passing through the slits when a blade image obscures any part of the slits. In the preferred embodiment illustrated in FIG. 2 a number of thin elongate lenses L1-Ln are mounted so as to view the reverse side of each slit, collect the light passing through the slits and to focus that light onto a number of fibre optic light guides F1-Fp, which are arranged to transmit the received light to a number of electronic detectors in an interface and control module (not shown). In an alternative embodiment illustrated in FIG. 3 the lenses L1-Ln and fibres F1-Fp may be replaced with an array of electronic detectors PD, such as a CCD array having sufficient active area to receive all light passing through the slit plane M1, in which case the sensor would still function exactly as for the preferred embodiment but would lose the advantage of being electronically passive. If the slit separation is sufficient to allow a blade image to complete its pass over a given slit before obscuring any part of the next slit in turn, then a single detecting means Ln, Fn can be used instead of a number of individual detecting means, provided that the field of view of the lens Ln is sufficient to collect the signal passing through all m slits.

Blade Measurement in Tip Tracking Mode

Figure 4:
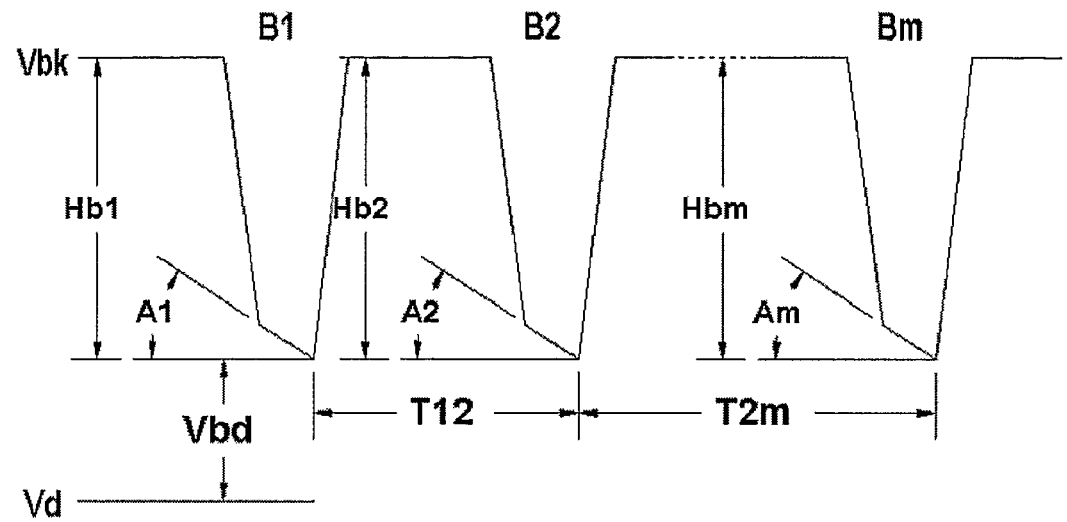
FIG. 4 is an example of a signal created by a blade passing the sensor in orientation BL1 as shown in FIG. 2.

To measure the position of a blade tip the sensor is oriented with its slits S1-Sm parallel to the blade length, thereby producing image BL1 as shown in FIG. 2. As the blade image moves from slit to slit a signal is produced as shown in FIG. 4. When no blade is in the field of view of the sensor, and hence no image is produced on the slits, the sensor produces a background signal level Vbk. As a blade begins to pass across a slit the signal level quickly ramps down at a first rate of change. A second rate of change of signal level occurs due the pitch of the blade, with the signal produced having an amplitude Hb1-Hbm, the minimum amplitude of which is above the dark level Vd by an amplitude Vbd. From this signal it is thus possible to determine for each blade the ratio of illumination passing through the slits when the blade is in view of the sensor (reduced light level) to the illumination when the blade is not in view (maximum light level). A further visualisation is that the signal produced by the sensor approximates the view of the blade tip from the sensor. It will therefore be appreciated that if a blade tip moves up or down with respect to the sensor (and thus the helicopter airframe) the change in signal amplitude between the background illumination Vbk and the illumination when the blade tip is in view Hb1-Hbm will be easily determined and is thus directly indicative of blade tip position. A change in the ratio of illumination, and thus signal level, between individual blades is indicative of a single blade being incorrectly positioned, whereas an equal change in ratio of signal level for all blades is merely consistent with the rotor assembly as a whole being tilted during normal flight conditions.

By way of an example, for a typical helicopter rotor blade of 10 meters diameter and blade tip width of 0.3 meters, which is capable of an overall vertical displacement of ±0.5 meters from its mid position at the tip, it may be desirable to measure that displacement with an accuracy of 0.1%, equivalent to ±0.5 mm. If the sensor is mounted 4 meters, for example, from the blade tip (as in position SN1 for blade tip tracking) and the lens assembly has a focal length of 40 mm, the image formed on the sensor substrate M1 of a 1 meter field of view will be 10 mm in length. For a vertical change in blade tip position of 1 mm, the image will move by 10 µm.

The following discussion explains the advantage provided by the sensor of the present invention by the inclusion of multiple slits in the opaque mask. If a blade tip profile were perfectly flat but had a 1 mm square raised imperfection on its surface, and it was desirable to detect such a feature, and the vertical position of the blade tip image relative to the full field of view of the sensor was near to the top of a single slit (thereby allowing near-maximum light through the slit), that imperfection would appear as a 10 µm square in the slit. The ratio of the area of that imperfection to the total area of the 10 mm long slit will determine the accuracy required of the detection means in order to recognise features of this magnitude. If the slit were 10 mm long and 250 µm wide, it could hold 25,000 such features in its total area, and therefore the detection means must be capable of resolving 1 part in 25,000. If the slit were 125 µm wide, then the accuracy need only be 1 part in 12,500, but for the same overall sensor performance the detector sensitivity would need to be increased by 2 as the total amount of light passing through the slit would be halved. Electronic noise in the detector will increase in some relationship to the gain, and in the limit, the sensor accuracy would be determined when the amount of noise energy is equal to the incoming light energy from a feature for a given slit dimension.

However, if two slits are placed adjacent to each other on the image plane, as in embodiments of the present invention, each with its own detection means, then as the blade image passes over each slit in turn the signal from each slit is separately detected. By temporarily storing the individual signals in the data processing and control module they can be subsequently added together. The part of the signals relating to the actual position of the blade would add linearly, assuming that the background illumination does not change significantly during the period when the blade passes through the sensor field of view, and the noise signals would therefore reduce by a factor of $\sqrt{2}$, thus improving the signal to noise ratio. If m slits are added, the noise will reduce by $\sqrt{m}$.

If the slits are placed adjacent to each other but are angularly divergent, as in embodiments of the present invention and as shown in FIG. 2, there will be a time delay between each detector signal from a given part of a blade which will be proportional to the position of the blade image along each slit. In other words, there will be a greater time delay between each detector signal for the part of the slits that are furthest apart than for the part of the slits closest together. As the angle between each slit is preferably constant, a blade passing on a path orthogonal to the centreline of the divergent pattern will produce the same amplitude of signal from each slit, and therefore the noise reduction ratio will be the same as for a number of parallel slits, namely $\sqrt{m}$. However, if the signals from each detecting means are also added together in their true time relationship, the frequency of the resulting signal will be directly proportional to the position of the blade image on any given slit, assuming that the blade velocity does not change significantly for the period when the blade passes through the sensor field of view.

It is therefore possible to derive a number of measurements of blade position which have a degree of independence from the divergent pattern of m slits, namely m values to which noise reduction techniques can be applied, creating a position measurement derived from the amplitude of the light signal reaching the detecting means, and m−1 time (interval) values, which can either be averaged to create a single value or used to compete a median frequency using fast Fourier transform (FFT) processing techniques, but in either time dependent case describe the blade position in a manner that is independent of the amplitude of the light signal reaching the detector. These position values can then be either reported separately and/or averaged to produce a single position value, but in any case, the resulting measurement will be more accurate than one derived from a single slit.

Blade Measurement in Mid Blade Tracking Mode

Figure 5:
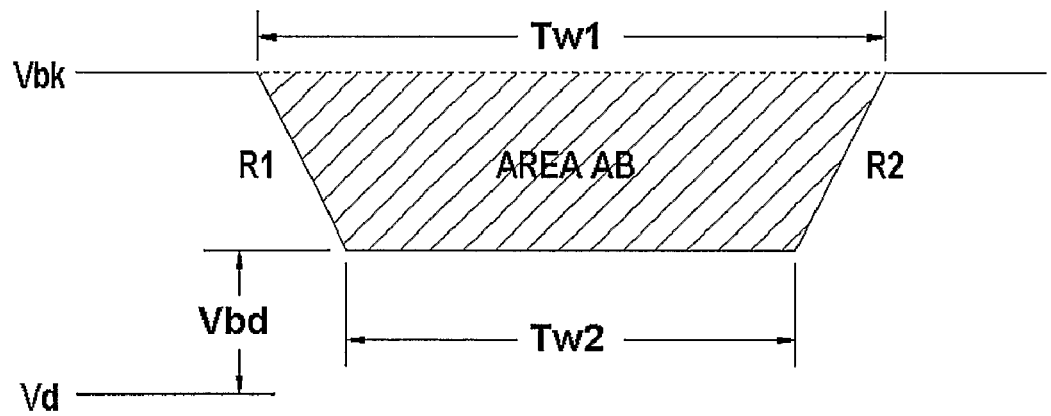
FIG. 5 is an example of a signal created by a blade passing the sensor in orientation BL2 as shown in FIG. 2.

For mid blade tracking the sensor is oriented with its slits S1-Sm orthogonal to the blade length thereby producing image BL2 as shown in FIG. 2 and as the image moves from slit to slit a signal is produced as shown in FIG. 5. When no blade is in the field of view the sensor produces a signal Vbk, the background level. As a blade passes across each slit, it produces a signal of area AB, the lowest point of which is Vbd above the dark level Vd. As the blade enters the field of view and begins to obscure the start of the slit, the amount of light entering the slit will reduce in a linear manner, creating a "downward" ramp R1 in the signal. When all of the blade has passed the start region of the slit, the amount of light entering the slit will then be constant until the blade has passed over the full length of the slit and started to create an "upward" ramp R2 as it moves out of the end region of the slit. As a blade passes across the slits in this manner, the area AB (shown hatched) of the signal formed will change in direct proportion to the distance of the blade from the lens and therefore measuring the area of the pulse will give a direct reading of the height of the blade above a given reference position. Note that as the blade changes its vertical position the area of the pulse will change both in width and height and therefore the change in blade height can be determined either by a timing method measuring the pulse width or an amplitude method measuring the pulse height, or a combination of the two, with the results being combined or reported independently.

As there are m slits and the signals detected from each slit will (apart from noise) be identical, the signals from all slits can be added together and, as with the previous tip tracking method, an increase in the signal to noise ratio obtained.

By way of an example, for a typical helicopter rotor blade of 0.3 meters width that is capable of an overall vertical displacement of ±0.25 meters from its normal position at some point along its length, it may be desirable to measure that displacement with an accuracy of 0.5%, equivalent to ±1.25 mm. If the sensor is mounted (say) 2 meters from the blade (as in position SN2 for mid blade tracking) and the lens assembly has a focal length of 40 mm, the image formed on the sensor substrate M1 of a 0.3 meter wide blade will be 3 mm in width. For a vertical change in blade position of 1.25 mm, the image will change its width by 7.5 µm.

To correctly compare the mid blade position of a number of blades in a rotor assembly the pitch angle of all blades must be the same. If the blades have different blade pitch angles their apparent width will be different, which without knowledge of the blade pitch would be interpreted as a change in distance of the blade from the sensor, as discussed above. It is therefore important to be able to measure the pitch angle. The pitch angle can be derived from the signals produced when performing blade tip tracking according to the present invention and as described above. Referring again to FIG. 2, and as previously noted, a second rate of change of signal amplitude occurs directly as a consequence of the blade tip being pitched as it passes across each slit. Consequently, the blade pitch angle can be directly determined from the angle of the signal A1-Am. It will be appreciated that the angle A1-Am will not necessarily be equal to the pitch angle of the blades but will be proportional to the pitch angle. The function of proportionality will differ for different blade designs and the detector must ideally be calibrated by taking a series of signal readings for different positions of blade with respect to the sensor and at different pitch angles. It is therefore necessary to utilise two sensors to perform accurate mid blade tracking incorporating blade pitch correction.

Figure 6:
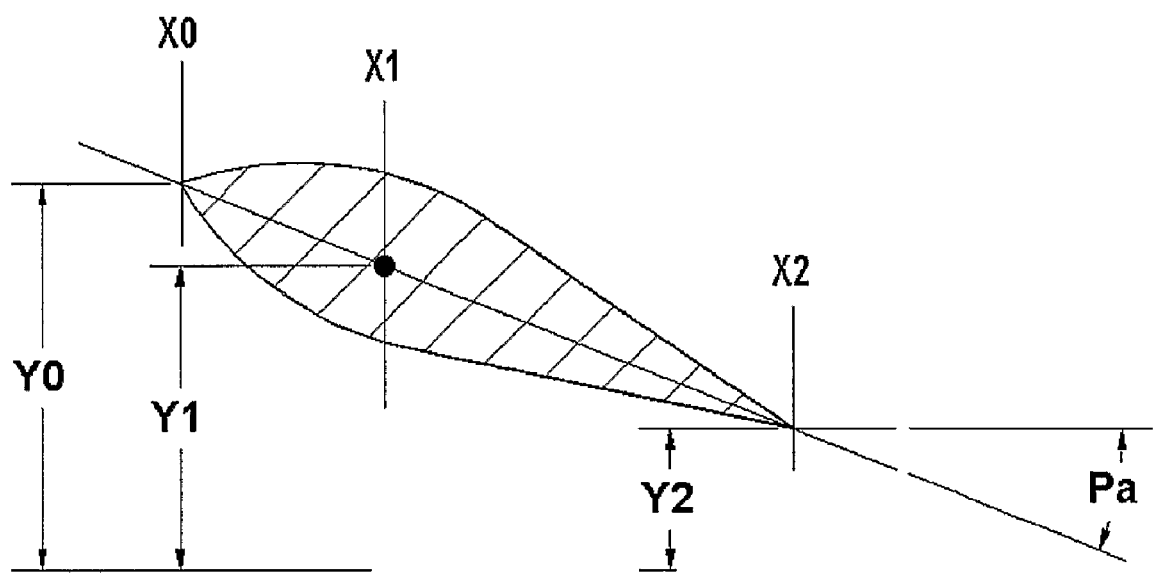
FIG. 6 shows a section of a blade used to illustrate the measurement of blade pitch.

FIG. 6 shows a section through a typical blade which rotates in pitch about a fixed point (X1,Y1). Using the sensor it is possible to measure all relevant X and Y values as the blade tip passes the sensor and particularly the points (X0,Y0) and (X2,Y2). Knowing the blade width measurement X0-X2 and the physical dimensions of the blade, the distances X1-X2 and Y1-Y2 and the pitch angle Pa can be calculated.

An image will be formed over the slits provided that there is sufficient contrast between the blade and its background, either by operating the sensor with an illuminated background such as the sky in natural daylight, or with artificial illumination on the underside of the blade against a darker background such, as a dark building wall or the sky in darkness, and with the polarity of the detected signal reversed.

The detector of the present invention can also used as part of an automatic gain control system (AGC) to measure the ambient light falling on the detector when no blade is within the field of view and this measurement used to change the gain associated with the detecting means to compensate for changes in background or blade illumination if such compensation is required for different amounts of daylight illumination, thereby eliminating the need for a separate detector for AGC purposes.

It is particular advantageous and of commercial importance that the same sensor can be used to measure the position of a rotor blade tip, a rotor blade at any position along the length of the blade and to measure the pitch of the blade on its mounting shaft. It is also considered to be a significant advantage that the preferred embodiments of the invention employ a sensor which is electronically passive, thereby eliminating mounting problems when in close proximity to existing helicopter instrumentation and allowing a wider range of environmental operating conditions than for a device containing electronic components.

The invention claimed is:

1. A position detector for detecting the position of a helicopter blade comprising:
 a sensor arranged to generate a signal in dependence on the position of the helicopter blade with respect to the sensor; and
 a data processing module arranged to receive the signal from the sensor and generate an output indicative of the helicopter blade position from the received signal,
 the sensor comprising:
  a mask having a plurality of angularly divergent slits formed therein;
  a lens assembly having a field of view and being arranged to direct incident light onto a focal plane of the lens assembly at which the mask is located; and
  a light detector arranged to detect the level of illumination passing through each of the plurality of slits in the mask and provide a signal indicative of the illumination level to the data processing module, wherein the data processing module is arranged to receive the signal for each slit and sum the signals to generate a combined signal, wherein the ratio of combined signal amplitude when a helicopter blade is in the field of view of the lens assembly to when a helicopter blade is not in the field of view is indicative of blade height in relation to the sensor position.

2. A position detector according to claim 1 wherein the data processing module is arranged to receive the signal for each slit and to determine a time delay between signals from adjacent slits, wherein the time delay is indicative of blade height in relation to the sensor position.

3. A position detector according to claim 2 wherein the mask is arranged such that the slits are substantially longitudinally aligned with a helicopter blade as the helicopter blade passes through the field of view of the lens assembly and the data processing module is arranged to determine the rate of change of signal for each slit as the helicopter blade passes across the slit, the rate of change of signal being proportional to the pitch angle of the helicopter blade.

4. A position detector according to claim 3, wherein the data processing module is arranged to modify the indicated height of the blade in relation to the sensor position as indicated by the ratio of combined signal amplitude in dependence on the blade pitch angle.

5. A position detector according to claim 1, wherein the angle of divergence between adjacent slits is uniform.

6. A position detector according to claim 1, wherein the number of slits is at least three.

7. A position detector according to claim 1, wherein the light detector comprises a plurality of lenses, each lens arranged to receive the light from a respective slit and to couple the received light into a respective optical fibre, each optic fibre being coupled to the data processing module.

8. A position detector according to claim 1, wherein the light detector comprises one or more light sensitive elements arranged to receiving light from the slits and convert the received light to an electrical signal transmitted to the data processing module.

9. A position detector according to claim 1 wherein mask is arranged such that the slits are substantially longitudinally aligned with a helicopter blade as the helicopter blade passes through the field of view of the lens assembly and the data processing module is arranged to determine the rate of change of signal for each slit as the helicopter blade passes across the slit, the rate of change of signal being proportional to the pitch angle of the helicopter blade.

10. A method of detecting the position of a helicopter rotor blade comprising:
providing a first sensor having a lens assembly arranged to gather incident light at a focal plane and a mask located at the focal plane of the lens assembly and having a plurality of angularly divergent slits formed therein;
detecting the amplitude of illumination passing through each of the plurality of slits as the helicopter rotor blade passes across the field of view of the lens assembly and providing a signal indicative of the amplitude of illumination; and
summing the amplitude signals for each slit to provide an combined signal, wherein the ratio of signal amplitude when a helicopter rotor blade is in the field of view of the first sensor to when a helicopter rotor blade is not in the field of view of the sensor is indicative of the helicopter rotor blade height in relation to the first sensor position.

11. The method of claim 10, wherein the slits are arranged to be substantially parallel to the helicopter rotor blade when the helicopter rotor blade passes through the field of view of the lens assembly and the field of view of the lens assembly is arranged such that the tip of the helicopter rotor blade is within the field of view.

12. The method of claim 11, wherein a time delay between signals from adjacent slits is determined, the time delay being proportional to the helicopter rotor blade height in relation to the first sensor position.

13. The method of claim 12, wherein the slits are arranged to be substantially orthogonal to the helicopter rotor blade when the helicopter rotor blade passes through the field of view of the lens assembly and the field of view of the lens assembly is arranged such that a mid portion of the helicopter rotor blade is within the field of view of the lens assembly.

14. The method of claim 11, wherein the rate of change of amplitude signal as a blade tip passes across a slit is proportional to the pitch angle of the helicopter rotor blade.

15. The method of claim 14, wherein
the first sensor is provided with slits arranged to be substantially parallel to the helicopter rotor blade when the helicopter rotor blade passes through the field of view of the lens assembly, the method further comprising:
determining the pitch angle of the helicopter rotor blade from the signals generated from the first sensor;
providing a second sensor having slits arranged to be substantially orthogonal to the helicopter rotor blade when the helicopter rotor blade passes through the field of view of the lens assembly and determining the height of the helicopter rotor blade in relation to the second sensor position from signals generated from the second sensor; and
modifying the helicopter rotor blade height signal of the second sensor according to the helicopter rotor blade pitch angle determined by the first sensor.

* * * * *